(12) United States Patent
Phillips

(10) Patent No.: US 7,337,901 B2
(45) Date of Patent: Mar. 4, 2008

(54) EQUIPMENT AND TOOL ORGANIZER

(76) Inventor: Ralph H. Phillips, 2741 Country Meadows Dr., Shelby, OH (US) 44875

( * ) Notice: Subject to any disclaimer, the term of this patent is extended or adjusted under 35 U.S.C. 154(b) by 325 days.

(21) Appl. No.: 11/095,408

(22) Filed: Mar. 30, 2005

(65) Prior Publication Data

US 2006/0219586 A1   Oct. 5, 2006

(51) Int. Cl.
*A45C 11/26* (2006.01)
(52) U.S. Cl. .................. 206/349; 206/373; 220/23.83; 220/735
(58) Field of Classification Search .............. 206/216, 206/234, 372, 373, 561; 220/212, 23.83, 220/521, 729, 735
See application file for complete search history.

(56) References Cited

U.S. PATENT DOCUMENTS 4,867,332 A * 9/1989 Mains ...................... 220/735
5,337,892 A * 8/1994 Zaffina .................. 206/315.11
5,441,163 A * 8/1995 Carrasco ................. 220/23.86
5,659,995 A * 8/1997 Hoffman ..................... 43/54.1
5,836,446 A * 11/1998 Varnom ..................... 206/373
6,460,287 B1 * 10/2002 Louie .................... 206/315.11
6,823,998 B2 * 11/2004 Fabregas .................... 206/373

* cited by examiner

*Primary Examiner*—Luan K Bui
(74) *Attorney, Agent, or Firm*—Porter Wright Morris & Arthur, LLP

(57) ABSTRACT

An organizer releasable attachable to a rim of a bucket comprising a rounded end conforming to the rim of the bucket such that a handle of the bucket freely rotates to a position in a plane above the organizer from the rounded end side of the bucket when the organizer is attached to the bucket and a second end opposite the rounded end cantilevers over the other side of the bucket. The organizer comprising one or more compartment having at least one of a solid floor and one or more opening.

18 Claims, 6 Drawing Sheets

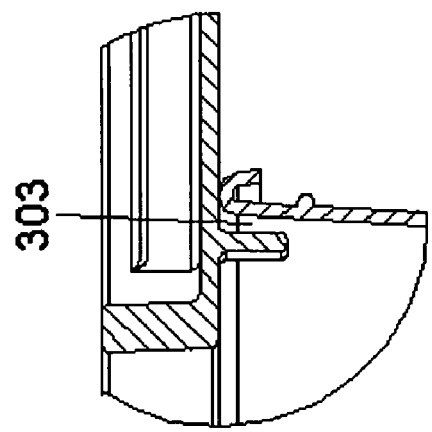
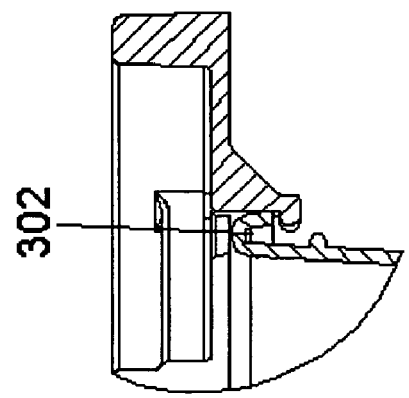
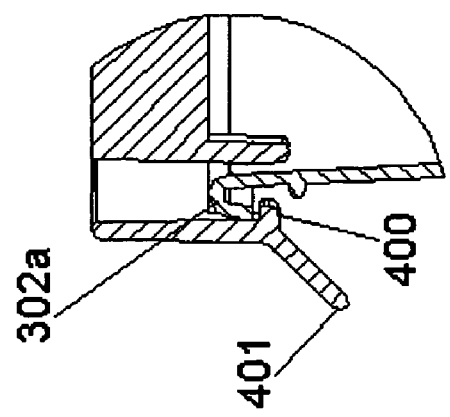

EQUIPMENT AND TOOL ORGANIZER

FIELD OF THE INVENTION

The present invention relates to equipment, implement, accessory and tool carrying devices, particularly devices that releaseably secure to the opening of a five gallon bucket container.

BACKGROUND OF THE INVENTION

Tool and equipment organization allows for more efficient work activities and more enjoyable leisure activities. A job site or activity may be remote from the location of tool or equipment storage. A device organizing tools and or equipment generally saves the user time. An aim of organizers is the ready accessibility of the tool and or equipment. An organizer may be a specifically designed container or an existing container easily adapted to carry the needed tool, equipment, accessory and the like.

Existing containers, such as empty 5-gallon buckets, have long been use to carry tools, gardening implements, sporting equipment, cleaning supplies and the like. Buckets have been the focus of add-on devices to organize tools and equipment in or on the bucket. These devices fit in, on, around and or over a bucket and come with various configurations of openings and holding mechanisms. Most existing devices screw on to the bucket, clip to, or tie over the bucket.

Existing devices sometimes divide and section the available space in a bucket in attempts to provide organization. These devices assist in organization, but suffer from the loss of the use of the interior of the bucket. Some of these devices are stackable trays that conceal the items inside the bucket so that a user may forget where an item was placed and spend time searching each tray for the desired item. Another limitation of in-the-bucket organizers is the inability to safely carry long objects, such as hoes, shovels, rakes, fishing poles, shot guns, rifles, pipes and the like. When the center of gravity for the long object is above the fulcrum of the attachment point, the weight of the top of the object causes the bucket to tip and spill the equipment as well as anything else in or on the bucket.

Devices to accommodate items outside of a bucket have been developed. Examples of outside-the-bucket organizers include pocketed devices and those that fit to the outer sides of the bucket. Outside devices are typically made from fabric with a multitude of pockets. While the fabric allows for flexibility in pocket sizing to carry various sizes of tools and equipment, the fabric wears and is difficult to clean if it becomes soiled. These devices are better at accommodating long tools and equipment, but a fastener is usually required to secure the object. Plastic devices exist, but no simple device exists that combines the carrying or positioning of a long tool or piece of equipment outside of the bucket with means to readily access small items related to the task.

Many existing devices are made for a single type of use and are not adaptable for cross uses. Organizers for fishing supplies and painting equipment exist, but are difficult to adapt for use in each other's area or for any additional uses. Buying multiple buckets to hold objects and items specific for each use is expensive and multiple buckets consume space.

A need exists for an organizer adaptable to an empty 5-gallon bucket that holds and organizes all types of tools, gardening implements, sporting equipment, cleaning supplies, hobby supplies and the like. A need exists for a durable organizer that allows the user use of the interior of the bucket, allows for carrying long objects, such as tools, equipment, etc., and provides means to accommodate related supplies in an easily accessible manner.

SUMMARY OF THE INVENTION

The organizer of the present invention provides an inexpensive portable storage device having the advantages of maintaining items above the surface of a bucket to allow use of the interior of the bucket, offering areas to maintain items beyond the rim of the bucket for holding long objects such as tools, equipment, etc., and providing easy access to related supplies and accessories. The organizer of the present invention is made from a durable material, such as wood, metal, plastic, and the like. The organizer allows a user access to the interior of the bucket while the organizer is attached to the bucket and is easily removed from the bucket to allow use of the organizer on more than one bucket. The organizer can be used to create a variety of customized work and or leisure activity workstations.

The present invention is a releasably attachable organizer comprising an underneath surface having an arc-shaped first end and generally linear opposite sides extending from each endpoint of the arc-shaped first end to a second end. The opposite sides extend the second end beyond a diameter starting at a midpoint of the arc-shaped end. In that the arc-shaped end corresponds to the circumference of the bucket, the second end of the organizer is cantilevered over the opposite side of the bucket. The underneath surface comprises one or more attachment having a lip to releasably attach the organizer to a bucket. The one or more attachment is positioned on the underneath surface along a circumference continuing from the endpoints of the arc-shaped end. At least one attachment has a flexible tab that a user extends to release the organizer from the bucket.

The organizer comprises a top surface opposite the underneath surface. The top surface comprising a plurality of substantially vertical partitions forming at least one compartment. A compartment has a bottom comprising at least one of a solid floor and one or more opening. The organizer comprises a thickness that is relatively small in relation to a length of the underneath surface. The height of the thickness is such that the handle, when positioned at the arc-end of the organizer, freely rotates to a position above the organizer when the organizer is attached to the bucket.

The present invention and its advantages and uses will become apparent from the following description taken in conjunction with the accompanying drawings. The drawings constitute a part of the specification of the invention, which includes exemplary embodiments of the present invention and illustrate various objects and features thereof.

BRIEF DESCRIPTION OF THE DRAWINGS

FIGS. 4a and 4b are sectional views of attachment embodiments and FIG. 4c is a sectional view of a stabilizer.

DETAILED DESCRIPTION OF THE INVENTION

The present invention is formed from a durable material, such as a metal, wood, strong plastic or other generally rigid material. In an embodiment, the present invention is molded as a single piece of generally rigid plastic material, such as a polyethylene; however the invention may be comprised of more than one part.

Figure 1:
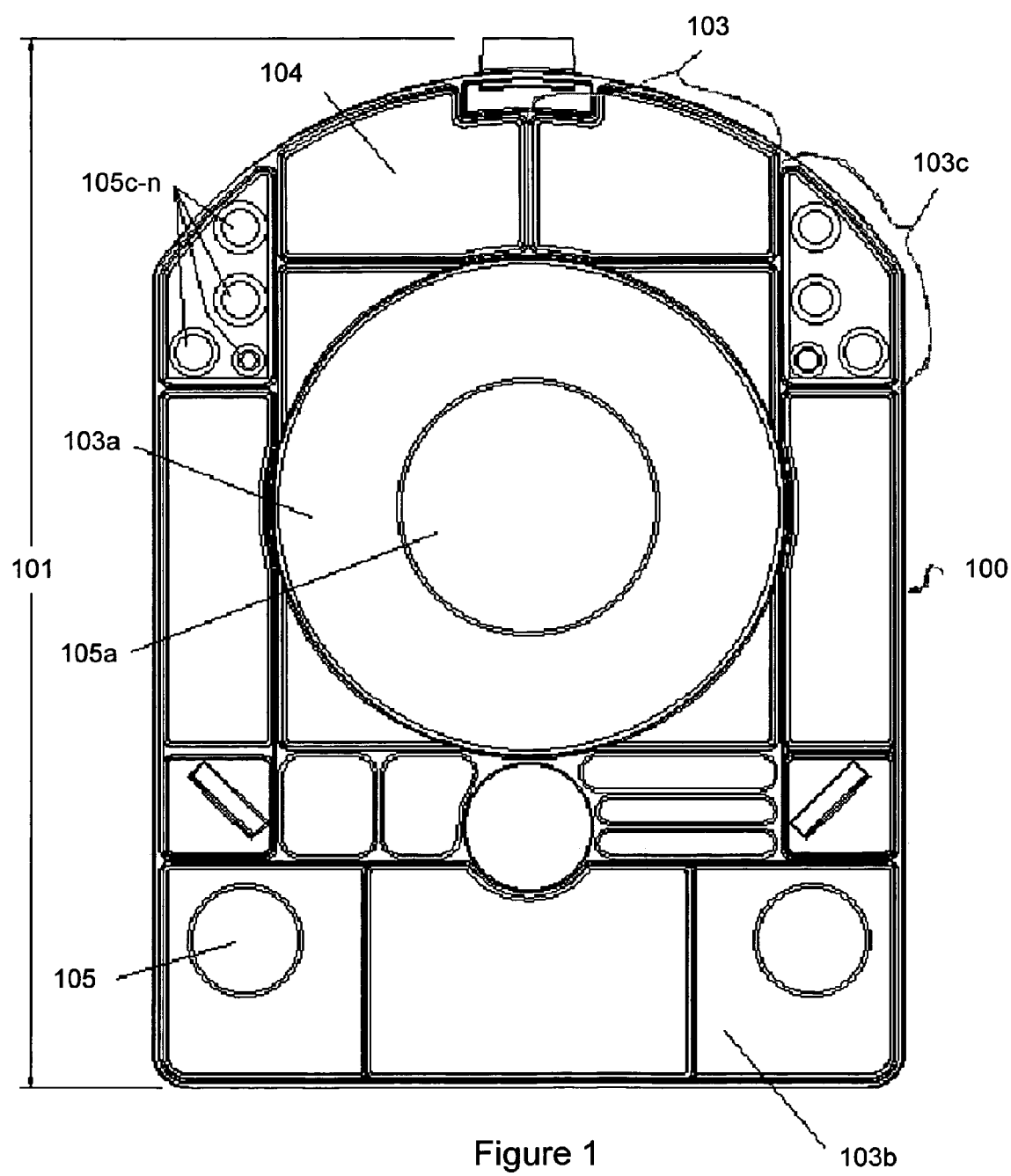
FIG. 1 is a diagrammatical depiction of the top surface of the organizer.

As shown in the Figures, the organizer comprises a top surface 100 a thickness 200 and an underneath surface 300. Referring to FIG. 1, the top surface 100 has a shape and a length 101 generally the same shape and length as the underneath surface 300 (depicted in FIG. 3). The top surface 100 has a plurality of substantially vertical short partitions 220 (best seen in FIG. 2) that form at least one compartment 103. A partition 220 may form part of more than one compartment. For example, see FIGS. 1 and 2, where a partition 220 forms both compartment 103a and compartment 103c. The compartment 103 is accessible from the top surface 100 of the organizer. As shown in FIG. 1, the compartment 103 has a bottom 104 which may be a solid, at least one opening 105, or a combination thereof. An opening 105 is also accessible from the underneath surface 300.

In the illustrated embodiment, the shape of the organizer at a first end is a rounded arc generally corresponding to the shape and circumference of the rim of a 5-gallon bucket. The first end fits to the shape of the bucket such that the handle of the bucket can be rotated to a plane above the organizer from that side of the bucket when the organizer is attached to the bucket. At a point on the organizer prior to the radius of the circumference that is perpendicular to a midpoint of the arc, the sides of the organizer each extend in a generally straight line from each endpoint of the arc to each endpoint of a second end of the organizer. The length 101 includes the arc section length and the side length and is sufficient to position the second end so that the second end cantilevers over the opposite side of the bucket from the arc-shaped end of the organizer. The second end extends over the bucket to a point that prevents the handle of bucket from rotating to a plane above the organizer when the handle is positioned on the side of the bucket having the extended end and the organizer is positioned on the bucket. The overall shape of the top surface 100 is shaped to support a standard tray container, such as is typically used to contain paint to be applied with a roller-type brush.

Figure 2:
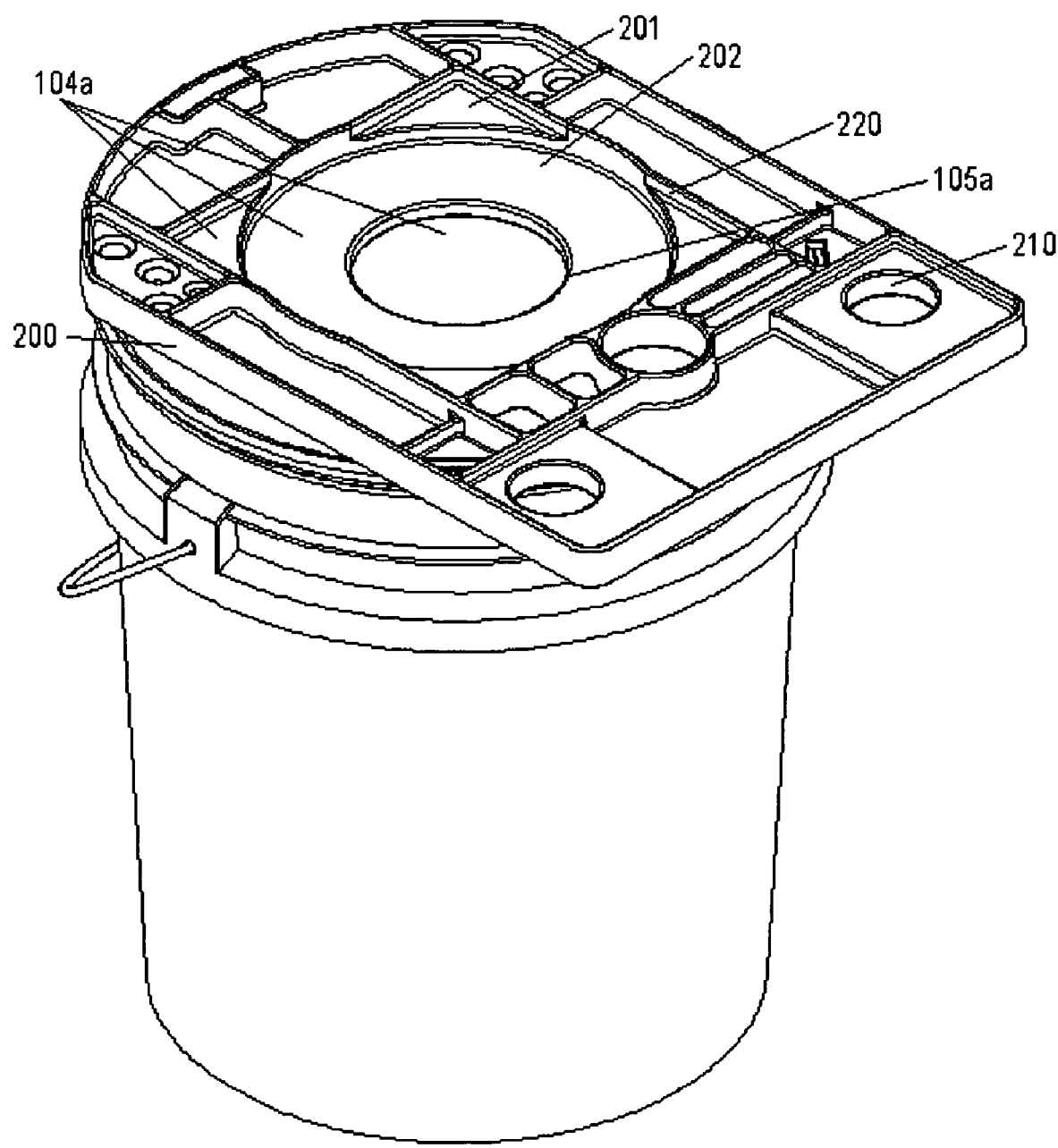
FIG. 2 is a perspective view of the organizer situated on a typical bucket.

The thickness 200 of the organizer is depicted in FIG. 2. The thickness 200 is of such height to allow the handle of the bucket to be rotated to a plane above the organizer at the arc-shaped end of the organizer so that a user may carry the bucket with the organizer and any tools, equipment, etc., using the handle of the bucket. The thickness 200 of the organizer is relatively small in relation to the length 101. The height of the thickness 200 may be consistent or vary over the length 101. In the embodiment depicted in FIG. 2, the vertical short partitions 220 are generally equal in height to the height of the thickness 200; however any of the vertical short partitions 220 or the thickness 200 may be of varying heights provided that the handle may freely rotate above the heights at the arc end to a position to allow a user to carry the bucket with the organizer attached to the bucket.

Figure 3:
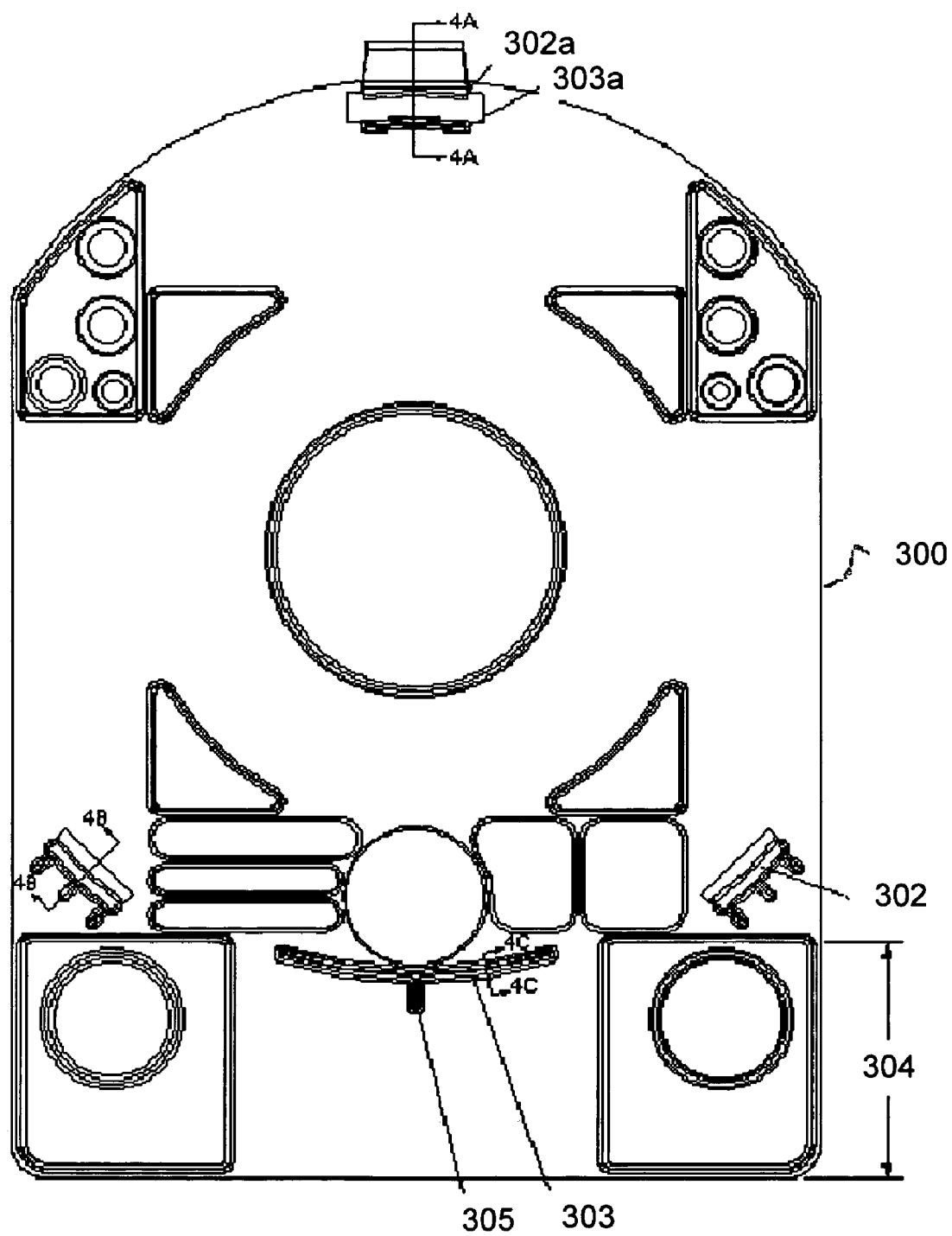
FIG. 3 is a diagrammatical depiction of the underneath surface of the organizer.

As shown in FIG. 3, the underneath surface 300 of the organizer comprises at least one attachment 302 used to releaseably secure the organizer to the rim of the bucket, and an optional stabilizer 303. The attachment 302 is positioned on the underneath surface 300 such that the arc end 304 of the organizer corresponds to the rim so that the handle of the bucket can be rotated to a position over the organizer when the organizer is attached to the bucket and the second end extends over the rim of the other side of the bucket to a point such that the bucket handle cannot be raised over the organizer at the extended end when the handle is positioned below the organizer and the organizer is attached to the bucket. The size and the arrangement of the attachment(s) can be varied as long as secure and releasable attachment to the bucket is provided.

In an embodiment having a centralized opening 105a, a user may pick up the organizer by grasping the centralized opening 105a of the organizer with the bucket attached. The attachment(s) 302 secure the organizer to the bucket such that a user can use the centralized opening 105a to lift the organizer attached to the bucket when the weight of the bucket and the organizer holding equipment, tools and the like has a weigh up to and including approximately 25 pounds.

In embodiments shown in FIGS. 4a and 4b, the attachment 302 has a lip 400 that engages the rim of the bucket such that the organizer snaps on to the bucket at the rim. The attachment 302a illustrated in FIG. 4a comprises a flexible tab 401 connected to the lip 400 and or the attachment 302a that a user extends to release the organizer from the rim.

Returning to FIG. 3, the underneath surface 300 optionally comprises at least one stabilizer 303, 303a. The stabilizer 303, 303a assists in aligning the attachment 302 to the rim of the bucket and decreases lateral movement of the organizer when the organizer is attached to the bucket. When the organizer is attached to a bucket, the stabilizer 303, 303a is positioned within the inside the bucket at an inner wall of the bucket corresponding to the rim of the bucket. The stabilizer 303 may be located on any point or arc of the circumference. In an embodiment, a stabilizer 303a is positioned generally opposite an attachment 302a such that the lip 400 of the attachment 302a engages the rim of the bucket and the stabilizer 303a fits inside the bucket at a wall immediately opposite the rim section engaging the attachment 302a. Alternatively, the stabilizer 303 is positioned at a different point of the circumference. In an embodiment, the stabilizer 303 is positioned generally at an end of the diameter of the circumference opposite the position of the attachment 302.

In the illustrated embodiment, the stabilizer 303 is located on the circumference at the opposite end of the diameter starting at the position of the attachment 302a with a tab 400. The attachment 302a with the tab 400 is positioned generally at the center point of the arc on the arc-shaped end of the organizer.

The stabilizer 303, 303a may include a rib 305 that corresponds to and engages a groove cut into and extending perpendicular to the rim of the bucket. The engaged rib 305 prevents rotation of the organizer on the bucket. The organizer may have more than one stabilizer 303, 303a. The organizer may have one or more stabilizer 303a positioned adjacent to an attachment in combination with one or more stabilizer 303 positioned at a different point on the circumference than the position of the attachment.

In an embodiment having three attachments illustrated in FIG. 3, the attachments 302, 302a, 302b each comprise a lip 400. The attachments 302, 302a, 302b are generally equally spaced about a circumference corresponding to a rim of a standard 5-gallon bucket. A first attachment 302a is positioned at the end of diameter beginning at the midpoint of the arc-shaped end of the organizer. In the illustrated embodiment, the first attachment 302a comprises a tab 401. The illustrated embodiment comprises a first stabilizer 303a positioned within the circumference at the point of the tabbed attachment 302a and a second stabilizer 303 positioned on the circumference generally at the opposite end of a diameter starting at the position of the tabbed attachment 302a. The second stabilizer 303 comprises a centrally positioned rib 305. The rib 305 serves as a fulcrum in releasing the organizer from the bucket when a user releases the tab 401 so that the organizer may be raised by the lifting the arc-shaped end having the tabbed attachment 302a by pivoting the organizer at the rib 305.

Returning to FIG. 1, each compartment 103 is shaped to hold one or more item. Depending on whether the bottom 104 is a solid, opening 105 or combination, each compartment 103 of the organizer is adaptable to hold a variety of items. In the illustrated embodiment depicted in FIG. 1, at least one compartment 103 has a solid floor to hold small items, including but not limited to small hardware items, including accessories, such as drill bits, socket sets, and the like as well as nails, screws, bolts, fasteners and the like; small car parts, such as spark plugs, interior items and other car replacement parts; gardening items, such as small implements, planting supplies, fertilizers, gloves, and the like; food items; hunting supplies, such as bullets and shells, cleaning supplies, range finders, handguns, and the like; fishing supplies, such as reels, line, bait, lures, small nets, cleaning equipment, and the like; painting supplies, such as fine brushes, trimmers, paint, and the like; cleaning supplies, such as dusters, cleaning accessories, supplies and the like; hobby supplies, such as tacks, glue, pins, needles thread and yarn, glue and glue sticks, other hobby tools and the like; other repair and replacement parts; and the like. Solid floor compartments may be are positioned on the organizer such that the compartment is over the inside of the bucket and or over the outside the circumference of the rim of the bucket when the organizer is attached to the bucket.

In the illustrated embodiment, an opening 105 in the bottom 104 of a compartment 103 may be substantially round or oval, substantially rectangular, and or a freeform shape. One or more wall 210 of an opening 105 extends from the top surface 100 toward the underneath surface 300. In an embodiment, the wall 210 is generally equal in height to the height of the thickness 200; however, any height wall 210 may be used. The wall 210 increases the stability of the organizer and provides support for any tool, equipment, etc., positioned in the opening 105. The wall 210 of an opening 105 may be optionally beveled from a point beginning at the top surface 100. The bevel is useful in assisting a user in inserting smaller items into the opening 105.

In the illustrated embodiment depicted in FIG. 1, a compartment 103c may optionally have more than one opening 105c-n. The openings 105c-n may be of various diameters and sizes and adapted to hold various items including but not limited to various sizes of similar items, such a set of screwdrivers, punches, chisels, small paint brushes and the like.

An opening 105 may also be shaped to hold a variety of sizes of (1) hardware items, such as adapters, extensions, handles, hammers, wrenches, pliers, ratchets, screwdrivers, sockets, small motorized tools, such as drills and the like; (2) gardening items, such as implements and accessories; (3) hunting equipment, such as guns, knives, bows and arrows, and the like; (4) fishing equipment, such as poles, lures, bait, fish cleaning equipment and related accessories; (5) painting supplies, such as brushes, extensions, detail equipment, cans, tape, rollers, and the like; (6) cleaning supplies, such as brooms, mops, dusters, brushes, solutions, and the like; (7) hobby supplies, such as clamps, soldering and glue guns, parts, and the like; and, (8) any other implement accessory or item that the user desires. Openings 105 may be are located on the organizer such that the opening 105 is over the inside of the bucket and or over the outside the circumference of the rim of the bucket when the organizer is attached to the bucket.

In an embodiment depicted in FIG. 2, a compartment 103a is generally centered on the top surface 100. The compartment 103a has a substantially rectangular bottom 104a having a multilevel floor. The floor has a first level 201 extending from the rectangular perimeter of the compartment 103a to a second level 202 in a plane different than the first level 201. The second level 202 is substantially circular and comprises an opening 105a. The opening 105a is shaped to accept the insertion of at least one object, such as a tool, implement, accessory and the like, and to allow access to the interior of the bucket with the organizer attached. A user can retrieve items from inside the bucket with the organizer attached to the bucket. In an embodiment, the opening 105a is sufficient to allow a user to carry the organizer attached to the bucket by grasping the opening 105a.

In the embodiment illustrated in FIG. 2, the first level 201 is shaped to hold the base of a standard rectangular container, such as but not limited to a square paint container. The second level 202 is shaped to receive the base of a standard circular container, such as but not limited to a cylinder-shaped paint container. In the illustrated embodiment, the first level 201 is in a higher plane than the second level 202 to allow a rectangular shaped container to be positioned in the first level 201 of the compartment 103a. The vertical short partitions 220 of the first level 201 are of sufficient height to prevent lateral movement of a similarly sized rectangular container placed on the first level 201 of the compartment 103a. The second level 202 is in a lower plane that the first level 201 to allow a cylindrically shaped container to be positioned in the second level 202 of the compartment 103a. The vertical short partitions 220 of the second level 202 are of sufficient height to prevent lateral movement of a similarly sized cylindrical container placed on the second level 202 of the compartment 103a.

In an embodiment illustrated in FIG. 3, a second end length 304 of the organizer extends beyond the rim of the bucket such that the handle of the bucket, when positioned below the second end, cannot be raised to a plane above the organizer when the organizer is attached to the bucket. The extended end length 304 cantilevers beyond the rim of the bucket and comprises at least one compartment 103b having at least one opening 105. The opening 105 is useful for holding long objects, such as tools, equipment, etc., including but not limited to hoes, shovels, rakes, fishing poles, shot guns, rifles, pipes, mops and brooms and the like. The compartment 103b may have a multilevel floor to form a sub-compartment for holding a tool, implement and the like, and or associated items or accessories, such used in sporting, gardening, hobby and or cleaning and the like.

In an embodiment, the top surface 100 comprises approximately fourteen compartments 103 separated by vertical short partitions 220. Approximately four of the compartments 103 comprise a solid bottom 104. Approximately six of the compartments 103 have a bottom 104 comprising at least one opening 105. Of the six compartments 103 with openings, three of the openings 105 are generally oval shaped, one is generally round, one is generally rectangular and one is freeform. Approximately four of the fourteen compartments 103 comprise a bottom 104 having a combination of a solid floor and at least one opening 105. At least one of the four combination compartments 103 comprises more than one opening 105. In an embodiment, a combination compartment 103 comprises four generally round openings 105c-n of various diameters. Of the four combination compartments 103, two have multi level floors. One multi level combination compartment 103 comprises two openings 105 and a floor level in a different plane with a solid floor. One skilled in the art would understand that the number and configuration of compartments, floors and openings is not limited to that illustrated, but any number and configuration of compartments, floors and openings may be used.

Figure 5:
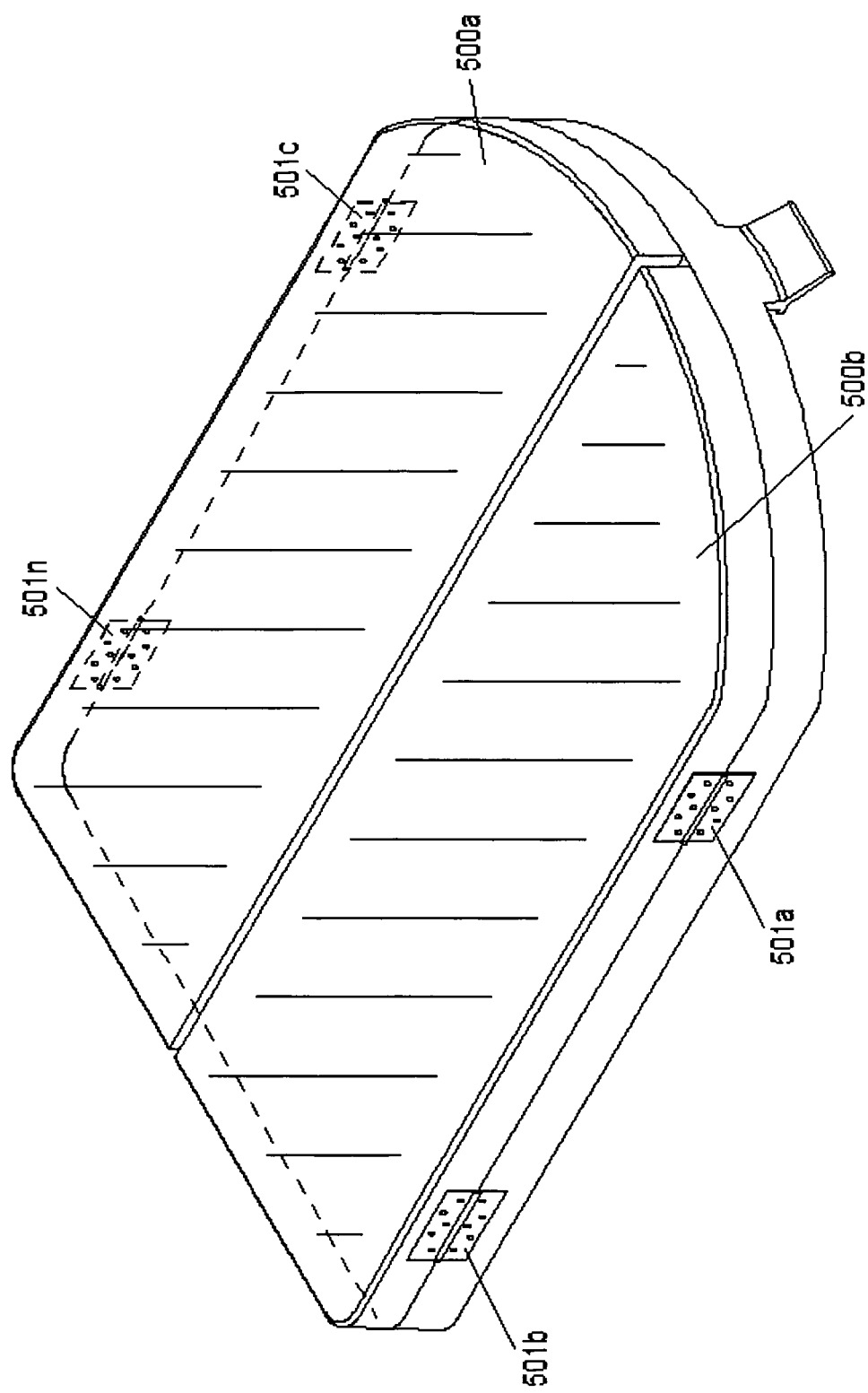
FIG. 5 is a diagrammatical depiction of an alternate embodiment of the organizer showing covers over the top surface.
Figure 6:
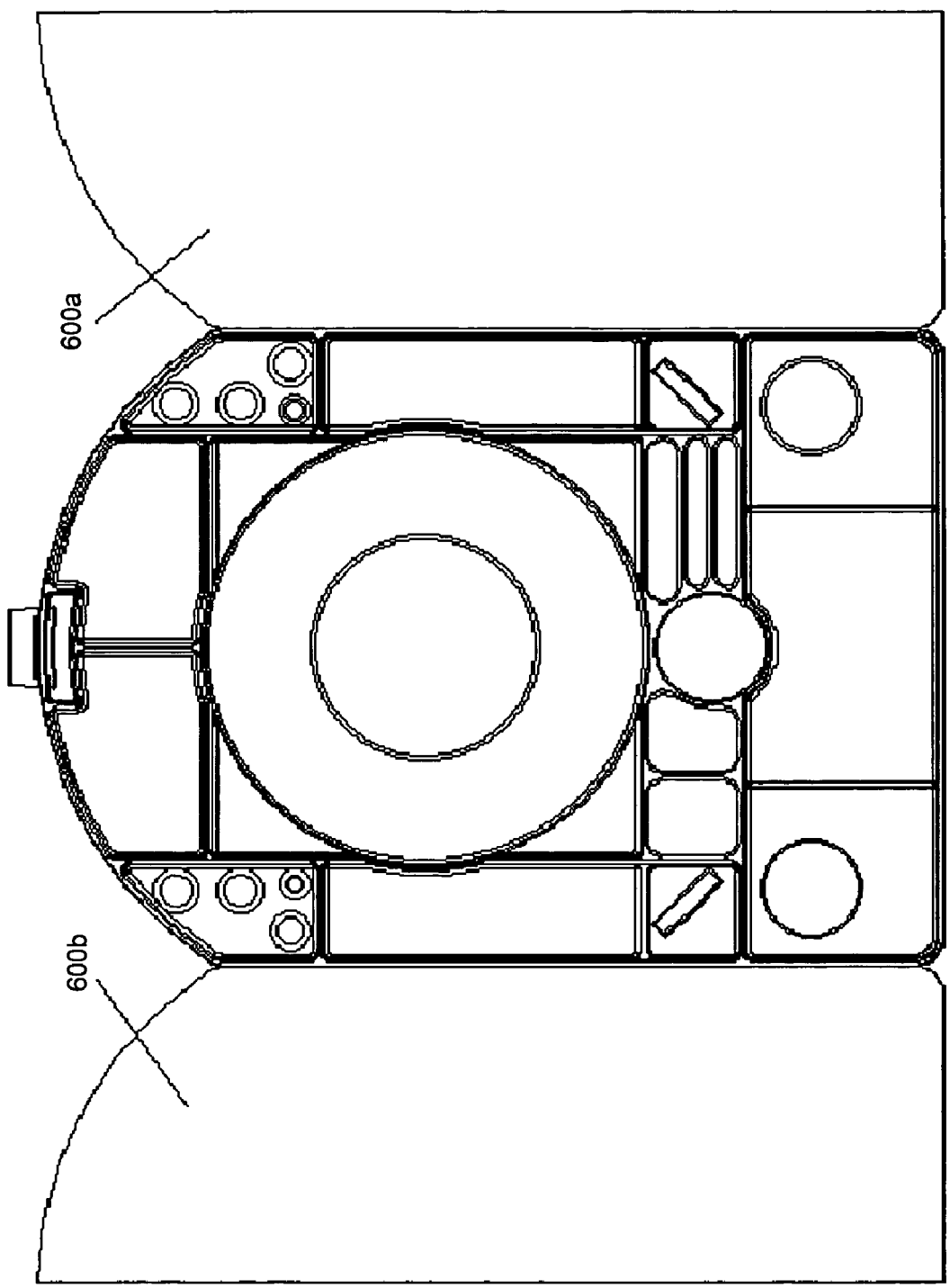
FIG. 6 is a diagrammatical depiction of the alternate embodiment of the organizer of FIG. 5 showing the covers in an extended position.

As depicted in FIGS. 5 and 6, an embodiment of the organizer includes one or more cover 500a, 500b corresponding to all or a portion of the top surface 100. FIG. 5 depicts an embodiment having two covers 500a, 500b in position over the top surface 100. The cover(s) 500a, 500b are shaped so that when positioned over the top surface 100, the cover(s) are generally flat against the top surface 100 and allow the bucket handle to rotate to a plane above the organizer from the arc-shaped end when the organizer is attached to the bucket. The illustrated embodiment comprises covers that are generally planar, but any height and shape of cover is adaptable to the invention. FIG. 6 depicts the embodiment of FIG. 5 showing two covers 500a, 500b in deployed positions. One skilled in the art would understand that the number and configuration of cover(s) is not limited to that illustrated, but any number and configuration of cover(s) may be used.

The cover 500a, 500b may be removable or affixed to the remainder of the organizer. The cover is connected 501a-n to allow the cover to be removed, such as by means to releasably secure the cover 500a, 500b to the top surface 100 and or thickness 200 and or underneath surface 300. Removable means include but are not limited to snapping, hook and loop, releasable tabs, and the like. Alternatively, the cover(s) 500a, 500b are connected by affixing means, such as but not limited to a hinge, pin, joint, etc., that connects the cover 500a, 500b to the top surface 100 and or thickness 200 and or underneath surface 300. An inner surface 600a, 600b of the cover 500a, 500b optionally includes one or more compartment 103 having a bottom that is at least one of a solid floor and one or more opening 105.

In the embodiment illustrated in FIGS. 5 and 6, the organizer comprises two hingedly attached covers 500a, 500b. The size and shape of the covers combined are generally the same size and shape as that of the top surface 100. In the illustrated embodiment, the covers are two equal halves; however, a cover may be any size and shape and two or more covers may be unequally sized so long as the overall size and shape of the cover(s) allow free rotation of a handle of a bucket from the arc-shaped end of the organizer to a plane above the organizer when the organizer is attached to the bucket.

In the embodiment illustrated in FIG. 5, each cover 500a, 500b is connected to the thickness 200; however, the cover 500a 500b may alternatively be connected to the top surface 100 and or the underneath surface 300. The cover 500a, 500b is connected by a connecting means 501a-n. In an embodiment, the connecting means 501a-n is one or more generally spaced hinge that allows rotation of the cover 500a, 500b to an open position. In the illustrated embodiment, each cover 500a, 500b is connected to the thickness 200 by two spaced hinges; however, the cover 500a, 500b may be connected by any number of connection means 501a-n so long as they allow the cover to be moved from the top surface 100. In an embodiment, the connection 501a-n limits the extension of a cover 500a, 500b so that the inner surface 600a, 600b of the extended cover is in the same plane as the top surface 100.

The foregoing descriptions of specific embodiments and examples of the present invention have been presented for purposes of illustration and description. They are not intended to be exhaustive or to limit the invention to the precise forms disclosed, and obviously many modifications and variations are possible in light of the above teachings. It will be understood that the invention is intended to cover alternatives, modifications and equivalents. The embodiments were chosen and described in order to best explain the principles of the invention and its practical application, to thereby enable others skilled in the art to best utilize the invention and various embodiments with various modifications as are suited to the particular use contemplated. It is therefore to be understood that within the scope of the appended claims, the invention may be practiced otherwise than as specifically described herein.

What is claimed is:

1. A releasably attachable organizer comprising:
    an underneath surface having an arc-shaped first end and generally linear opposite sides extending from each endpoint of the arc-shaped first end to each endpoint of a second end, said opposite sides extending the second end beyond a diameter starting at a midpoint of the arc-shaped end, said underneath surface comprising at least one attachment having a lip, said at least one attachment (1) positioned on the underneath surface along to a circumference continuing from the arc-shaped end, and (2) having a flexible tab;
    a top surface opposite the underneath surface, said top surface comprising a plurality of substantially vertical partitions forming at least one compartment, said compartment having a bottom comprising at least one of a solid floor and at least one opening;
    at least one stabilizer, said stabilizer comprises a rib and extending from the underneath surface at one of (1) a position proximate to the attachment having the tab and (2) at any point of the circumference; and
    a thickness that is relatively small in relation to a length of the underneath surface.

2. The organizer of claim 1 wherein the opening is a shape selected from the group of substantially round, substantially rectangular and freeform.

3. The organizer of claim 1 wherein the opening comprises at least one generally vertical wall extending from the top surface toward the underneath surface.

4. The organizer of claim 3 wherein the vertical wall includes a bevel extending from the top surface.

5. The organizer of claim 1 wherein the compartment is generally centered on the top surface, said compartment having a substantially rectangular multilevel bottom, said multilevel bottom having a first level extending from the rectangular perimeter of the compartment to a second level in a plane different than the first level, said second level substantially circular and having at least one of a solid floor and at least one opening.

6. The organizer of claim 5 wherein the first level is adapted to receive a base of a standard rectangular container and the second level is adapted to receive a base of a standard circular container.

7. The organizer of claim 1 wherein the top surface is shaped to support a standard tray container.

8. The organizer of claim 1 wherein the bottom of the compartment is adapted to receive objects selected from the group of small hardware items, small car parts, gardening items, food items, hunting supplies, fishing supplies, painting supplies, and cleaning supplies.

9. The organizer of claim 1 wherein the second end comprises at least one compartment bottom having at least one of a solid floor and at least one opening.

10. The organizer of claim 9 wherein the second end compartment is substantially rectangular and comprises a multilevel bottom, said second end multilevel bottom having a first level extending from each of the sides of the organizer, said each side first level having an opening, said first levels extending to a second level in a plane different than the first level, said second level having a solid floor.

11. The organizer of claim 9 wherein the opening is substantially round and shaped to accommodate a long object.

12. The organizer of claim 1 wherein the bottom of the compartment has more than one opening.

13. The organizer of claim 12 wherein the openings are various shapes and sizes adapted to hold various objects.

14. The organizer of claim 1 wherein the opening is shaped to hold a correspondingly shaped object.

15. The organizer of claim 1 comprising at least one cover operably connected to at least one of the top surface, thickness and underneath surface to move between a closed position wherein the cover overlies the top surface and an open position wherein the cover is away from the top surface to provide access to the top surface.

16. The organizer of claim 15 wherein an inner surface of the cover comprises a plurality of substantially vertical partitions forming said at least one compartment comprising a bottom having at least one of a solid floor and at least one opening.

17. An organizer releasably attachable to a bucket having a rim and a handle comprising:
   an underneath surface adapted to fit to the rim of the bucket, said underneath surface comprising (1) a length with a first end shaped and positioned to allow the handle of the bucket to freely rotate to a position in a plane above the organizer from the first end side of the bucket when the organizer is attached to the bucket, (2) one or more attachment for releaseably securing the organizer to the rim, said attachment positioned on the underneath surface such that a second end of the length is cantilevered over the bucket, said one or more attachment comprising a lip formed to engage the rim and wherein at least one attachment has a tab connected to the lip to release the organizer from the rim, and (3) at least one stabilizer extending from the underneath surface at a point along a circumference corresponding to an inner wall of the rim of the bucket, said stabilizer having a rib corresponding to and engaging a groove cut into and extending perpendicular to the rim;
   a top surface opposite the underneath surface, said top surface comprising a plurality of substantially vertical partitions forming at least one compartment, said at least one compartment having a bottom having at least one of a solid floor and at least one opening; and
   a thickness that is relatively small in relation to the length of the underneath surface.

18. A releasably attachable organizer comprising:
   an underneath surface having an arc-shaped first end and generally linear opposite sides extending from each endpoint of the arc-shaped first end to a second end, said opposite sides extending the second end beyond a diameter starting at a midpoint of the arc-shaped end, said arc-shaped end and sides positioned to allow the free rotation of a handle of a bucket from the arc-shaped end side of the bucket to a position above the organizer when the organizer is attached to the bucket, said underneath surface comprising (1) one or more attachment having a lip, said one or more attachment positioned on the underneath surface at one or more point corresponding to a circumference continuing from the arc-shaped end such that the second end extends beyond the rim of the bucket to a point that prevents the handle from rotating to a position over the organizer from a side of the bucket over which the second end extends, and wherein said one or more attachment has a flexible tab, and (2) at least one stabilizer, said stabilizer extending from the underneath surface at a position located along the circumference and having a rib;
   a top surface opposite the underneath surface, said top surface comprising a plurality of substantially vertical partitions forming at least one compartment, said at least one compartment having a bottom comprising at least one of a solid floor and one or more opening selected from the group consisting of substantially round, substantially rectangular and freeform, wherein the bottom of said at least one compartment has more than one level such that a first level accommodates the base of a conventional square paint can and a second level accommodates the base of a conventional round paint can, and wherein openings are positioned over the interior of the bucket and over the exterior of the bucket, said opening over the exterior of the bucket accommodating a long object;
   a thickness that is relatively small in relation to a length of the underneath surface; and
   at least one cover operably connected to the thickness to move between a closed position wherein the cover overlies the top surface and an open position wherein the cover is away from the top surface to provide access to the top surface.

* * * * *